(12) United States Patent
Tsenter

(10) Patent No.: US 10,511,051 B1
(45) Date of Patent: Dec. 17, 2019

(54) LI-WATER SECONDARY ELECTROCHEMICAL BATTERY

(71) Applicant: Boris Tsenter, Roswell, GA (US)

(72) Inventor: Boris Tsenter, Roswell, GA (US)

( * ) Notice: Subject to any disclaimer, the term of this patent is extended or adjusted under 35 U.S.C. 154(b) by 0 days.

(21) Appl. No.: 16/415,847

(22) Filed: May 17, 2019

(51) Int. Cl.
*H01M 10/36* (2010.01)
*H01M 10/0525* (2010.01)
*H01M 4/131* (2010.01)
*H01M 10/0563* (2010.01)
*H01M 4/12* (2006.01)
*H01M 4/485* (2010.01)

(52) U.S. Cl.
CPC ........ *H01M 10/0525* (2013.01); *H01M 4/12* (2013.01); *H01M 4/131* (2013.01); *H01M 4/485* (2013.01); *H01M 10/0563* (2013.01); *H01M 10/36* (2013.01)

(58) Field of Classification Search
CPC .................................................. H01M 4/8615
See application file for complete search history.

(56) References Cited

U.S. PATENT DOCUMENTS

2016/0197326 A1\* 7/2016 Visco .................. H01M 2/1673
429/405

\* cited by examiner

*Primary Examiner* — Christopher P Domone
(74) *Attorney, Agent, or Firm* — RC Trademark Company

(57) ABSTRACT

Disclosed herein is a secondary lithium-water electrochemical battery cell-comprising a water splitting bi-functional electrode in contact with an inorganic electrolyte, a reversible lithium electrode in contact with an organic electrolyte, a lithium salt and a $Li^+$-ion conductive membrane disposed between the organic and inorganic electrolytes. Cell charged as $Li-O_2$ couple and discharged as $Li-H_2$ couple.

11 Claims, 3 Drawing Sheets

LI-WATER SECONDARY ELECTROCHEMICAL BATTERY

CROSS-REFERENCE TO RELATED APPLICATION

This application claims the benefit of U.S. Provisional Application 62/698,228, filed Jan. 15, 2019, the content of which is hereby incorporated in their entirety.

FIELD OF THE INVENTION

This invention refers to the area of rechargeable electrochemical batteries. In particular, the embodiments described herein relate to the lithium-based batteries.

BACKGROUND

Lithium-hydrogen electrochemical secondary batteries ("Li—H2 battery") have been recently invented (U.S. patent Ser. No. 10/211,494). These batteries are comprised of a reversible Li electrode in an aprotonic electrolyte, a Li-ion conductive membrane and a reversible hydrogen electrode in a protonic electrolyte. By offering of two or three times more specific energy, a Li—H2 battery may require both an electrical source and also a hydrogen source. These requirements can be inconvenient for some applications.

SUMMARY

The embodiments described herein relate to the lithium-based batteries. In particular the embodiments described herein relate to the composition, design and operation of a new reversible Li-water electrochemical battery operated based on splitting water into oxygen and hydrogen. This process is divided in time. When the battery is charged, oxygen is produced and hydrogen is released during discharge. The present embodiments described herein further relate to a secondary lithium-water electrochemical cell comprising a water splitting bi-functional electrode in contact with an inorganic electrolyte (catholyte), a reversible lithium electrode in contact with an organic electrolyte (anolyte), a lithium salt and a $Li^+$-ion permeable separator disposed between the organic and inorganic electrolytes. The details of one or more embodiments are set forth in the detailed description below. Other features, objects, and advantages will be apparent from the description and from the claims.

DETAILED DESCRIPTION

Disclosed herein are secondary electrochemical cells using lithium element and water as active materials. In a process of charging, water may be oxidized, deliver electrons to lithium and oxygen may be produced on a bi-function positive electrode. A $Li^+$-ion may move across a only $Li^+$-ion conductive separator and may create a metallic deposit or a matrix of intercalated lithium. During discharging of a battery, Li may deliver electrons across load to a protons of catholyte and may move as a $Li^+$-ion across a $Li^+$-ion conductive separator. A bi-functional positive electrode may produce hydrogen. After some cycles, a water deficit created because of a production of oxygen and hydrogen is corrected by adding distilled water to an inorganic catholyte. Water's correction point is defined as per delivered discharging capacity or by sampling battery ohm resistance in the beginning and in the end of discharging.

Figure 1:
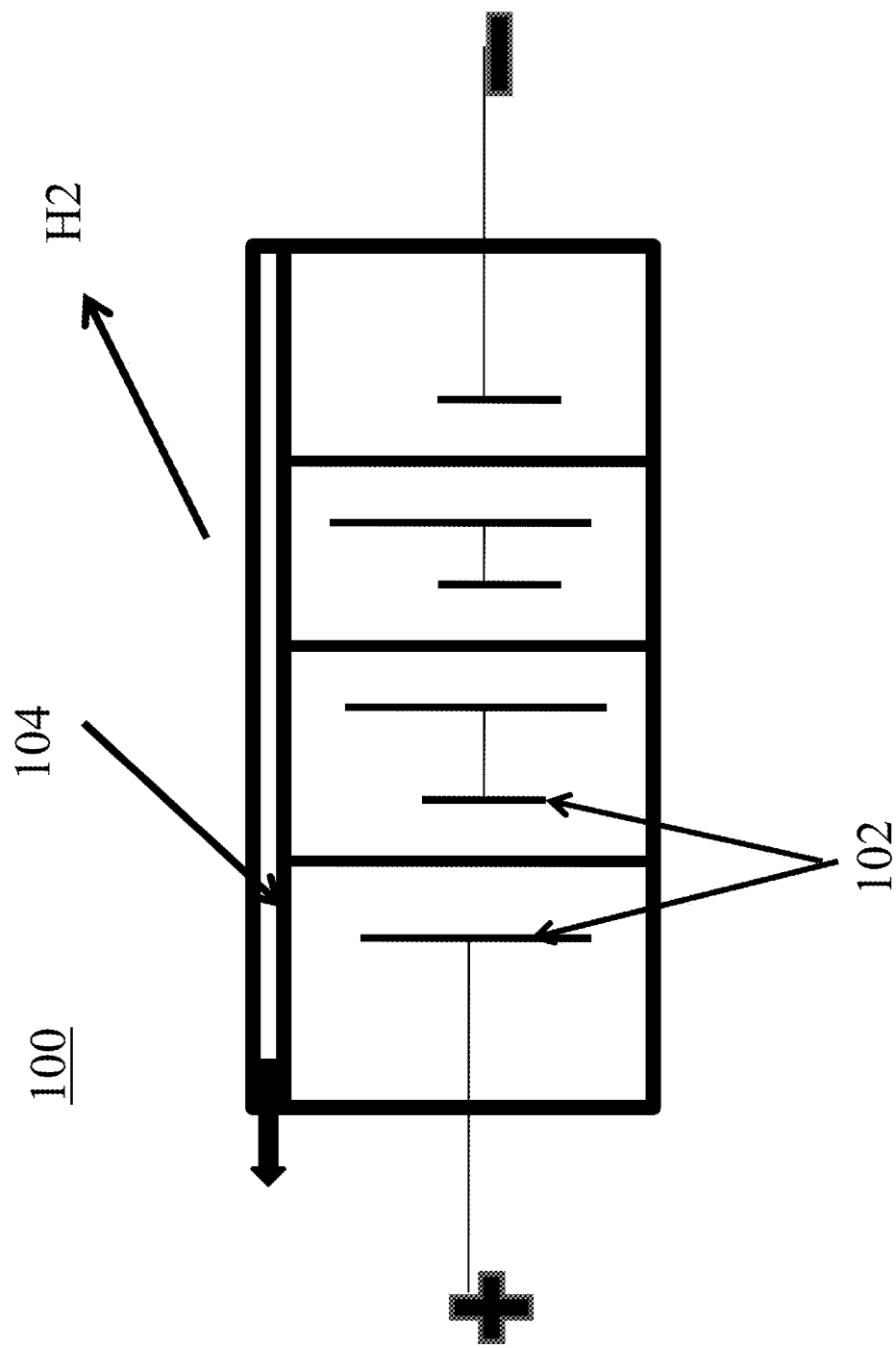
FIG. 1 illustrates a Li-water electrochemical battery in accordance with some embodiments.
Figure 2:
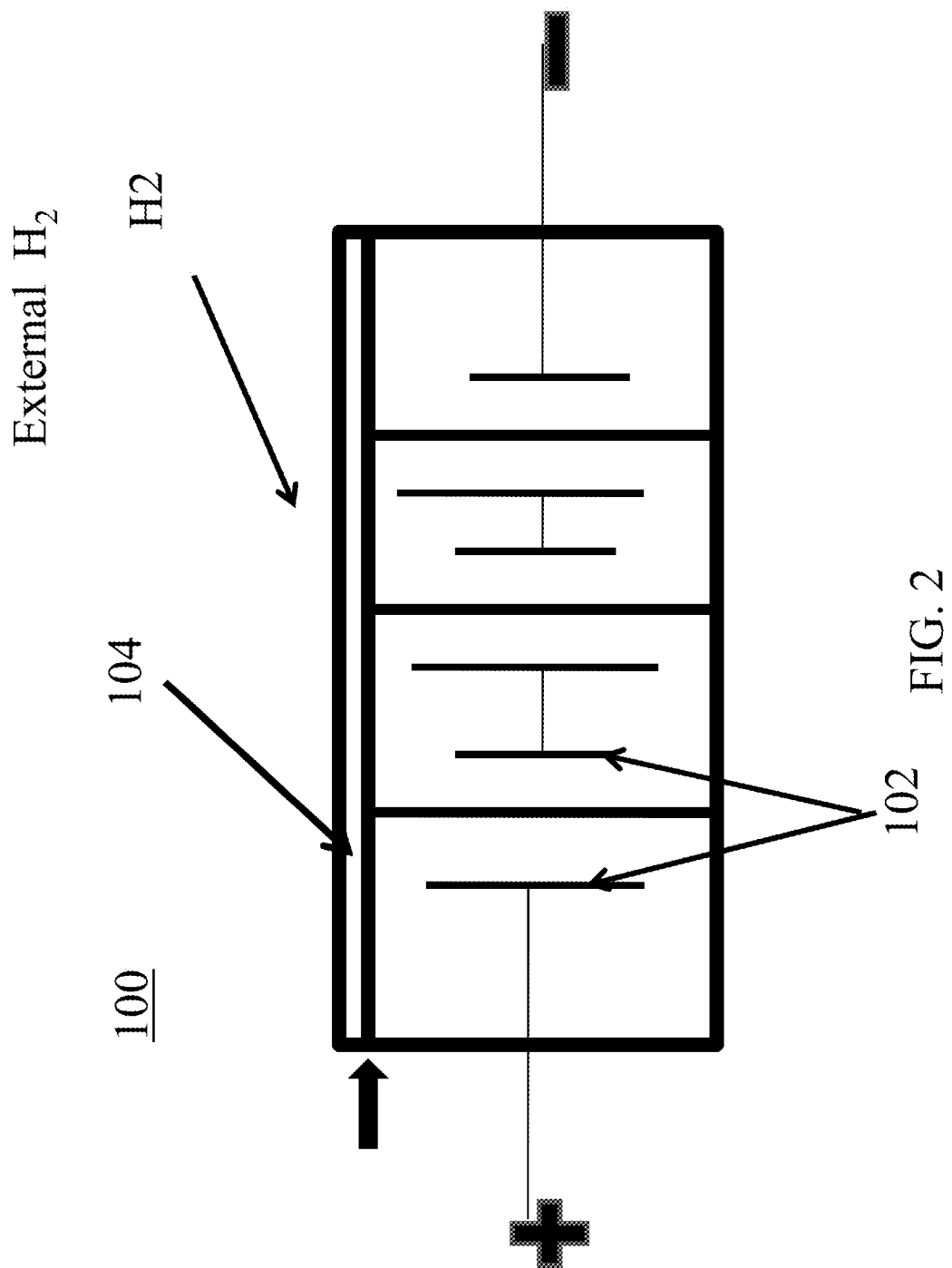
FIG. 2 illustrates a Li-water electrochemical battery in accordance with some embodiments.

Referring now to FIG. 1, an embodiment of a Li-water electrochemical battery 100 is illustrated. In some embodiments, FIG. 1, illustrates a Li-water electrochemical battery in the process of discharging. The Li-water electrochemical battery 100 comprises a plurality of cells 102. An internal area 104 of the Li-water electrochemical battery 100 may comprise a common $H_2$ area of the Li-water electrochemical battery 100. As illustrated in FIG. 1, $H_2$ is expelled from the Li-water electrochemical battery 100 and the expelled $H_2$ may be exhausted into the atmosphere, the expelled $H_2$ may be burned, the expelled H2 may be used in a fuel cell ("FC") and/or a regenerative fuel cell/reverse fuel cell ("RFC"). FIG. 2, on the other hand, illustrates a Li-water electrochemical battery 100 in the process of charging. As illustrated in FIG. 2, external H2 or RFC may enter the Li-water electrochemical battery 100. In some embodiments, during a charging process a Li electrode functions as a cathode. In some embodiments, during a discharging phase the Li electrode functions as an anode. These are reversed in a case of a gas electrode instead of a Li electrode.

Based on the above figures and formulas, the embodiments disclosed herein relate to a Li-water electrochemical battery comprised of electrochemical cells 102 using a lithium element and water as active materials. In a process of charging, as illustrated in FIG. 2, water may deliver electrons to lithium and oxygen may be produced on a bi-function positive electrode. $Li^+$-ions may move simultaneously across a $Li^+$-ion conductive separator and create a deposit as metallic or in matrix intercalated lithium. During the discharge of a battery, as illustrated in FIG. 1, Li may deliver an electron to a proton of a catholyte and may move as $Li^+$-ion across a $Li^+$-ion conductive separator. A bi-functional positive electrode may produce hydrogen. After some cycles, a water deficit may be created in the Li-water electrochemical battery because of the production of oxygen and hydrogen and this deficit may be corrected by adding distilled water to an inorganic catholyte. Water's correction point may be defined as per delivered discharging capacity or by sampling a battery's resistance (in Ohms) in the beginning and in the end of discharging. In some embodiments, the level of water needed may be 0.33 ml of distilled water per 1 Ah delivered capacity.

The embodiments described herein may relate to the development of a Li—H2 battery and, in particular, for a case where the hydrogen source for the battery charging is lacking. In this situation, a lithium cathode may be charged for the expense of electrons generated by water, which may then be converted to gaseous oxygen. Cobalt, or nickel corrole catalyst dispersed in carbon may be used for a reaction of oxygen production. Because a bi-functional electrode for oxygen and hydrogen production may be performed, a catalyst may be able to accelerate both of these functions. In some embodiments, a Li—$O_2$ battery may be charged in order to be discharged as a Li—$H_2$ battery. Because charging and discharging reactions may be associated with gas production, but not with gas consumption, activation and ohm polarizations, but not a rate of gas diffusion, are major contributors in voltage drop during discharging and a voltage rise in a process of charging. The generation of two different gasses on one electrode may narrow the scope of determining a catalyst. However, technologists continue their efforts to get acceptable bi-functionality from noble metals catalysts for use in water splitting.

The present embodiments disclosed herein relate to lithium/hydrogen secondary electrochemical cells that are comprised of reversible lithium and hydrogen electrodes with hydrogen production during the process of discharging and oxygen production during the process of charging. Replacement oxygen with hydrogen during the process of discharging may eliminate the creation of insoluble $Li_2O_2$.

During charging oxygen produced from water as per anode reaction where H is Hydrogen, e is electron, O is oxygen and Li is lithium:

$$H_2O-2e=\tfrac{1}{2}O_2+2H++2e. \qquad (1)$$

Two Li+ ions move to Li cathode in the electric field through the Li+ ion conducted diaphragm.

Two electrons move to cathode and convert two Li+ ions to two Li metals as per cathode reaction:

$$2Li++2e=2Li \qquad (2)$$

In the process of discharging Li metal liberates electrons on the anode as per reaction:

$$2Li=2Li++2e \qquad (3)$$

Electrons move across a load to the cathode and reduced protons of the electrolyte to gaseous hydrogen according reaction:

$$2H++2e=H_2 \qquad (4)$$

Two Li+ ions move in the electrical field through diaphragm to hydrogen cathode.

Output voltage during the process of discharging may be defined as a difference between OCV, which is 3.0V and a polarization's and ohm resistances (in ohms). The present embodiments reflect the farthest development of a Li—$H_2$ battery and in particular for a case when there is a lack of a hydrogen source for the battery charging as well as an additional battery discharging option. In this situation, a lithium cathode may be charged at the expense of electrons generated by water, which is converted in gaseous oxygen. Cobalt, or nickel corrole catalyst dispersed in carbon may be used for the reaction to produce oxygen. A bi-functional electrode for oxygen and hydrogen production performed using a catalyst may be able to accelerate both oxygen and hydrogen production. In view of this, a Li—$O_2$ battery may be charged in order to be discharged as Li—$H_2$ battery. Operation of a battery with gas production (e.g., hydrogen and oxygen) and not a gas ionization function may allow use of a catalyst other than catalysts from a noble metal group.

Figure 3:
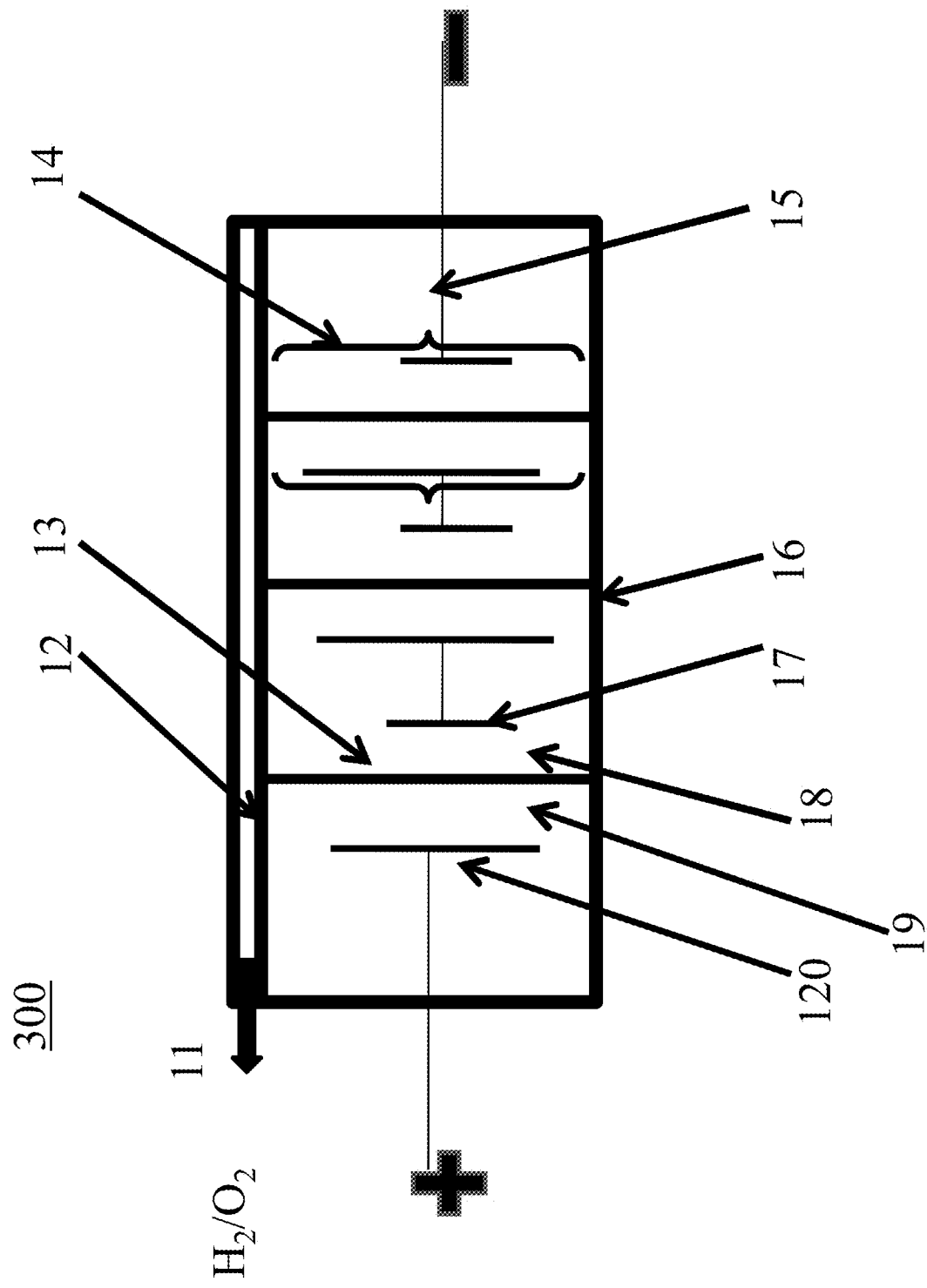
FIG. 3 illustrates a Li-water electrochemical battery in accordance with some embodiments.

While the charging-discharging cycle described herein is related to oxygen and hydrogen production, an inorganic electrolyte abuts separator and may reduce an amount of water within the cell and this water will need to be replaced. A water request may be used to indicate that more water is needed. Timing for the water request may be determined through sampling a battery's resistance (in ohms) during a charging process. Difference in ohm resistance at the beginning and at the end of charging may be measured for determining an ohm resistance of electrolyte associated with the loosing or consumption of water. This approach may allow the exclusion from consideration of all other components of battery ohm resistance. Because charging and discharging reaction may be associated with gas production, but not with gas consumption, activation and ohm polarizations, but not gas diffusion to the positive electrode, are major contributors in a voltage drop during process of discharging and a voltage rise during a process of charging. The generation of two different gasses on an electrode may narrow a scope of determining a catalyst. For example, the electrolytic film produced at Rice university and tested at Houston university is a three-layer structure of nickel, graphene and a compound of iron, manganese and phosphorus. This foamy nickel provides a large surface for the film and the conductive graphene protects the nickel from degrading. In another example, to find a catalytic material suitable for both electrodes, the Stanford team borrowed a technique used in battery research called lithium-induced electrochemical tuning. The Stanford team's idea was to use lithium ions to chemically break the metal oxide catalyst into smaller and smaller pieces. In yet another example, MIT worked on cobalt-containing polyoxometalates (Co-POM) as acid-stable catalysts for water oxidation. The electrode developed by MIT was more energy efficient than electrodes made from either iridium oxide or cobalt oxide mixed with carbon paste [24]. However, in embodiments described herein, a bi-functional positive electrode associated with charging and discharging are disclosed. Now referring to FIG. 3, an embodiment of a battery 300 is disclosed. The battery may comprise a case 16 and one 14 or more electrochemical cells 15 which, in the illustrated embodiment, the battery 300 comprises three series connected Li—$H_2$ cells 15. The battery 300 further comprises a gas passage 12 for expelling/discharging a gas 11 (e.g., oxygen during a charging process and hydrogen during a discharging process). Each of the electrochemical cells 15 may comprise an organic electrolyte 19 (catholyte) abutted to a Li-ion conductive membrane 13, an inorganic electrolyte 18 abutted to the Li-ion conductive membrane 13 and a bi-functional cathode 120. In some embodiments, the Li electrode is the anode while the battery is discharging and the Li electrode is the cathode when the battery is charging/charged. 12 is gas passage: oxygen or hydrogen during charging and hydrogen during discharging.

Large Li—$H_2$ battery for electrical transportation present some safety problems. For example, a release of a large amount of hydrogen in the discharge can create a hazard to the enclosed space. To remedy this issue, oxygen of air may be burned with the gasses that are expelled via the gas passage 12 and the product of this reaction is ecological clean water vapor.

Also, the embodiments described herein may use a conventional hydrogen-oxygen fuel cell for hydrogen release during a process of discharging. The fuel cell and the battery 300 may be connected in series for discharging and disconnected during a process of charging. The Ah $H_2$ amount realized by Li—$H_2$ battery should be equal of $H_2$ Ah amount consumed by fuel cell. When choosing material for the anode 17, we have to compare the product of OCV and gram equivalent weight.

TABLE 1

| Metal | Atomic mass, g | OCV, V | Specific Capacity, Ah/g | OCV×Specific capacity, wh/g |
|---|---|---|---|---|
| Li | 3.87 | 3.04 | 3.86 | 11.79 |
| Na | 22.98 | 2.71 | 1.16 | 3.14 |
| Ca | 40.07 | 2.86 | 1.23 | 3.76 |
| Mg | 24.30 | 2.70 | 2.20 | 5.84 |

From Table 1 is obvious that along with Li metals of Na, Ca and Mg may be also considered as potential candidates for replacement of Li anode. From Table 1, above, it can be noticed that the listed alkaline or rare earth elements, together with lithium, may be used in the reversible metal-water batteries. As for lithium itself, there are many efforts to increase specific capacity of the Li element incorporated as metal or in carbon and other matrix. Li-ion conducting glass or glass-ceramic materials may be readily reduced by lithium metal, and therefore a thin film of a stable lithium conducting material, such as $Li_3P$ or $Li_3N$ which may be inserted between a ceramic separator and Li metal may also be used. Li-ion conducive membrane based on glass-ceramic solid electrolyte interface may inhibit the formation of dendrites and may protect the lithium metal from atmospheric contamination. When choosing material for the anode, we have to compare the product of OCV and gram equivalent weight.

Based on the above-mentioned information, a secondary lithium-water electrochemical cell may comprise: a water splitting bi-functional electrode in contact with an inorganic electrolyte (catholyte), a reversible lithium electrode in contact with an organic electrolyte (anolyte), a lithium salt; and a $Li^+$-ion permeable separator disposed between the organic and inorganic electrolytes. In some embodiments, oxygen from water produced during charging on a positive water splitting electrode may generate electrons, and Li+ions may be moved across a Li-ion conductive diaphragm that accepts the electrons and these may be converted to a Li metal. In some embodiments, hydrogen from water that is produced during a discharging process of a positive water splitting electrode by accepting electrons generated by lithium and Li+ions may be moved across a Li-ion conductive diaphragm from anolyte to catholyte.

Electrolyte composition associated with the catholyte may be periodically adjusted with distilled water depending on an ohm resistance of battery or based on a delivered discharging capacity. An ohm resistance of a battery may be sampled at a beginning and at an end of charging via current interruption or a current changing sampling voltage change for a time interval of 1-5 ms after the current interruption or changing and using this value with a current prior to interruption or with a current changing. In some embodiments, a water splitting electrode for a battery comprises using mono-pore or bi-pores carbon, or graphene matrix with a maximum total porosity. In some embodiments, a catalyst for a gas electrode may be comprised from metals of the Pt group (e.g., ruthenium, rhodium, palladium, osmium, iridium, and platinum). In some embodiments, instead of a Li electrode alkaline or alkaline, a rare earth metal may be used on the battery negative electrode. For example, K, Na, Ca and Mg metals may be used on the battery negative electrode. The catalyst for the gas electrode may be comprised from at least one of the group of cobalt, nickel, and manganese complexes distributed inside of a porous matrix and may be treated in order to withstand low pH conditions which can occur under oxygen production. Prior to the discharging of the hydrogen manifold, the Li-battery may be connected to the hydrogen manifold associated with a hydrogen-oxygen fuel cell and an electrical battery and fuel-cell may be connected in series. In some embodiments, distilled water produced by FC in a process of battery discharging may be returned back to the battery.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A secondary lithium-water electrochemical cell comprising:
   a. a water splitting of hydrogen and oxygen irreversible bi-functional electrode in contact with an inorganic electrolyte;
   b. a reversible lithium electrode in the lithium-water electrochemical cell in contact with an organic electrolyte;
   c. a lithium salt in organic and inorganic electrolytes; and
   d. a $Li^+$-ion conductive membrane in the lithium-water electrochemical cell disposed between the organic electrolyte and the inorganic electrolyte, wherein the secondary lithium-water electrochemical cell is configured to be charged as a $Li-O_2$ cell and discharged as an $Li-H_2$ cell.

2. The secondary lithium-water electrochemical cell of claim 1, wherein oxygen, from water produced during charging on the water splitting of hydrogen and oxygen irreversible bi-functional electrode, (i) generates electrons, (ii) Li+ions are moved across the Li-ion conductive diaphragm, (iii) Li-ions dissolved in the organic electrolyte accepts electrons that are converted to Li metal and (iv) hydrogen from water produced during discharging on the positive water splitting bi-functional electrode, by accepting electrons generated by lithium and passed across a load and Li+ions, are moved across the Li-ion conductive diaphragm from anolyte to catholyte.

3. The secondary lithium-water electrochemical cell of claim 1, wherein electrolyte composition of the inorganic electrolyte is periodically adjusted with distilled water based on an ohm resistance of a battery comprising a secondary lithium-water electrochemical cell or based on a delivered discharging capacity.

4. The secondary lithium-water electrochemical cell of claim 3, wherein the ohm resistance of the battery is sampled at a beginning charging point and at a finishing charging point via current interruption or current changing via sampling a voltage change using a time interval of 1-5 ms after current interruption or by changing and referring the ohm resistance of the battery to a current prior to interruption or to current changing.

5. The secondary lithium-water electrochemical cell of claim 1, wherein the water splitting of hydrogen and oxygen bi-functional electrode comprises at least one of a mono-pore or bi-pores carbon, or graphene matrix.

6. The secondary lithium-water electrochemical cell of claim 1, wherein a catalyst for a gas electrode comprises at least one of a metal from the Pt group.

7. The secondary lithium-water electrochemical cell of claim 1, wherein a catalyst for a gas electrode is made from at least one of the group of cobalt, nickel, and manganese complexes distributed inside of a porous matrix.

8. The secondary lithium-water electrochemical cell of claim 1, wherein a hydrogen manifold of a battery comprising the secondary lithium-water electrochemical cell is connected to a hydrogen manifold of a hydrogen-oxygen fuel cell during discharging where the battery and the hydrogen-oxygen fuel cell are electrically connected in series, wherein the battery and hydrogen-oxygen fuel cell are disconnected during charging.

9. The secondary lithium-water electrochemical cell of claim 1, wherein hydrogen produced during a process of discharging is burned with air oxygen in an outlet, turning into water vapor.

10. The secondary lithium-water electrochemical cell of claim 1, wherein distilled water produced by a fuel cell comprising the secondary lithium-water electrochemical cell in process of a battery comprising the secondary lithium-water electrochemical cell discharging is returned back to the battery.

11. The secondary lithium-water electrochemical cell of claim 1, wherein the lithium electrode comprises at least one of K, Na, Ca and Mg metals.

* * * * *